Patented Apr. 24, 1945

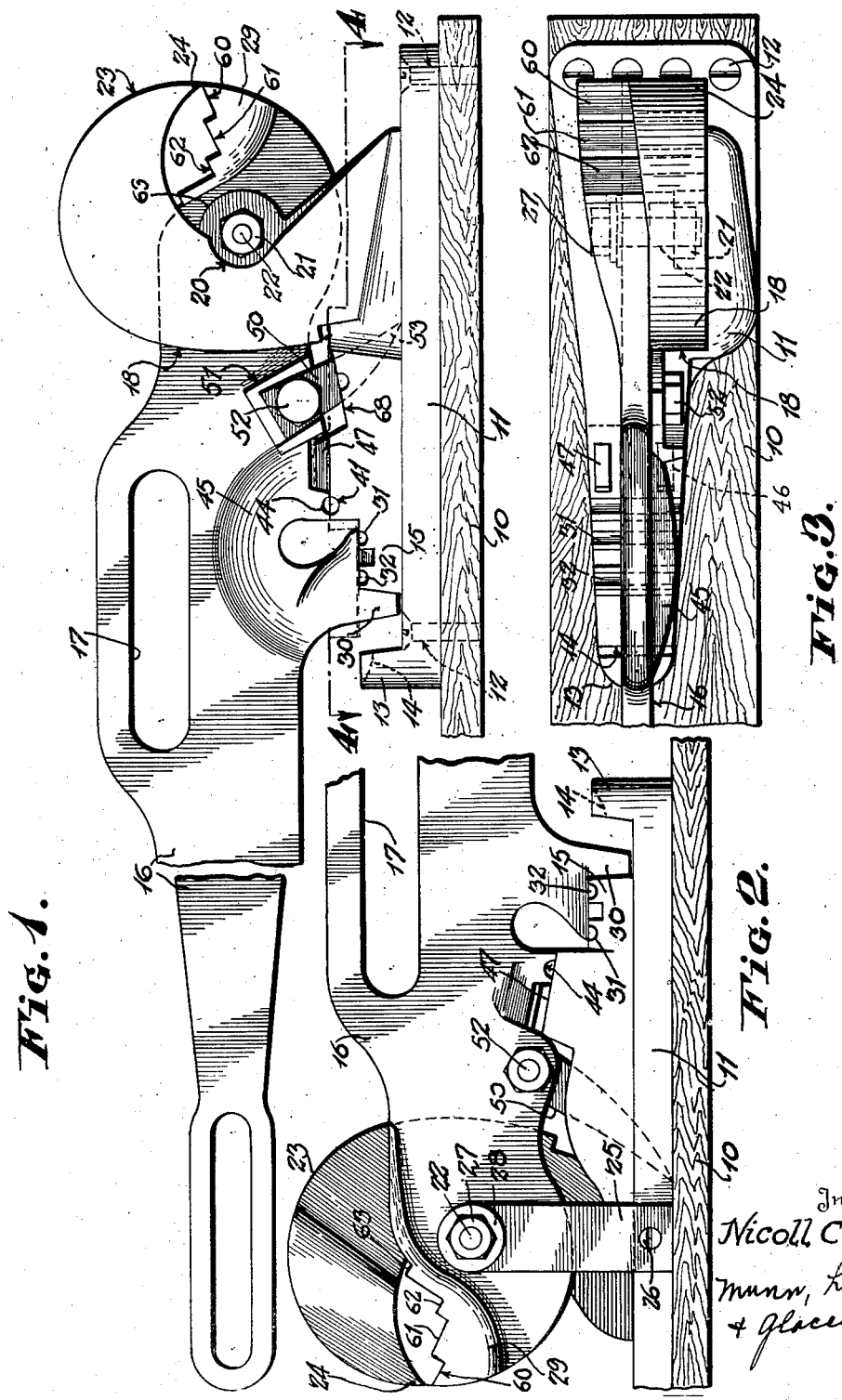

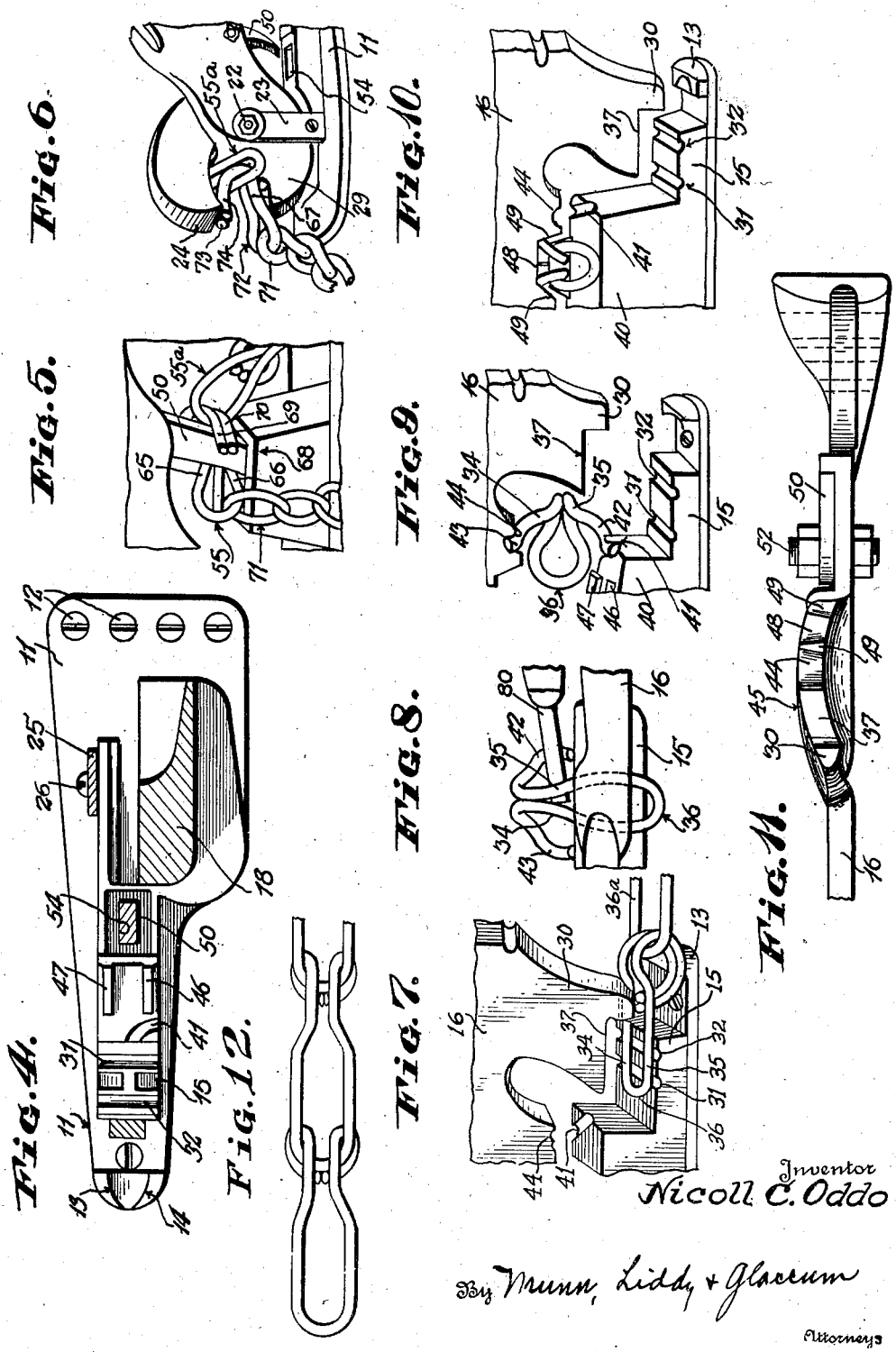

2,374,616

UNITED STATES PATENT OFFICE 2,374,616

TIRE CHAIN TOOL

Nicoll C. Oddo, Middletown, N. Y.

Application January 2, 1943, Serial No. 471,199

3 Claims. (Cl. 81—15)

This invention relates to improvements in a device for repairing chains.

An object of the invention is the provision of a device which may be fastened on a work bench, or which may be made portable, for opening and closing all sizes of several types of links of chains so that the links may be readily removed and replaced when necessary.

Another object of the invention is the provision of a device by means of which the connecting element of certain types of links may be easily and rapidly spread apart for removing the links, and whereby the connecting elements of new links may be readily forced into objective relation with associated links.

A further object of the invention is the provision of a device for readily removing ram's horn links from a chain in several easy operations, and replacing a worn link with a new one, the device including an elongated block having means thereon for supporting a link in a plurality of different positions for spreading the connecting elements of the link and for returning the spread elements of a new link to their proper positions, and connecting the new link to an adjacent link.

A still further object of the invention is the provision of a device having a plurality of means incorporated therein for not only removing worn links of various sizes from a chain, but for replacing various sizes of new links to the adjacent links of the same, the chains formed by the links being employed for tires or for other uses.

This invention will be best understood from a consideration of the following detailed description, in view of the accompanying drawings forming a part of the specifications; nevertheless, it is to be understood that the invention is not confined to the disclosure, being susceptible of such changes and modifications as define no material departure from the salient features of the invention as expressed in the appended claims.

In the drawings—

Fig. 1 is a one side view in elevation of a device constructed in accordance with the principles of my invention.

Fig. 2 is a fragmentary side view which is opposite to the view shown in Fig. 1.

Fig. 3 is a fragmentary plan view of the device shown in Fig. 1.

Fig. 4 is a horizontal view taken along the line of 4—4 of Fig. 1.

Fig. 5 is a fragmentary view in perspective of the device, showing the operation of spreading the connecting elements of one form of link preparatory to removing the link from a chain.

Fig. 6 is a fragmentary view in perspective of the device showing the closing of the connecting elements of a new link.

Fig. 7 is a fragmentary view in perspective of the device showing the first operation of removing a ram's horn link from a chain.

Fig. 8 is a fragmentary top plan view of the device showing the second step of spreading the connecting elements of a link.

Fig. 9 is a fragmentary view in perspective of the device, showing the first step in the operation of replacing a link on a chain.

Fig. 10 is a fragmentary view in perspective of the device, showing the final step for tying the link to an adjacent link.

Fig. 11 is a fragmentary bottom plan view of the handle and its jaw members.

Fig. 12 is a plan view of a pair of ram's horn links interengaged.

Referring more particularly to the drawings, 10 designates a base member upon which a link supporting block 11 is secured. The device shown in Fig. 1 is of the portable type, and the block 10 is of sufficient dimensions that it may be placed in any position for removing or replacing links at any point desired. However, the supporting block 11 may be secured directly to a bench, and thus form a stationary chain repairer. In either case the block is secured by means of bolts or screws 12 on to the base 10 or to a work table.

A block 11 has an upstanding member 13, at its inner end, which is rounded at the outer wall and has a flat face for its inner wall. The upper end of the member 13 has a depression 14 with the walls curved to receive the bent elements of a link, which forms a connector with an adjacent link. The type of link employed will be presently described.

A second supporting member 15 is located inwardly of the member 13, and is spaced therefrom to provide a support to the end of the link.

Before proceeding further, it is deemed advisable to describe the operating handle which carries a jaw so that the various cooperating elements of the jaw and block can be considered together.

The handle 16 may have any length desired, and, as is well known, the length of the handle will determine the leverage, and consequently the degree of pressure which may be exerted on the elements of the link during the various steps of the operation for removing and replacing links in a chain.

This handle has an elongated opening 17, which may be grasped by the hand for carrying the device from place to place as a portable instrument, and is at a point along the handle where there is a proper balance between the portions of the device at opposite sides of the opening 17.

The standard 18 is mounted on the outer end of the block 11, and this standard may be formed separately, or it may be formed integrally with said base member. The standard has a cut-out portion as shown at 20 in which is located a nut 21, threaded on to an axle or bolt 22, upon which one end of the handle 16 is pivotally mounted. The upper end of the standard is curved downwardly as shown at 23 to provide a stationary jaw 24 at the free end. A bar 25 (Fig. 2) is bolted to the block 11, as shown at 26, and has an opening at its upper end to receive the axle 22, with a nut 27 cooperating with the washer 28 to maintain the axle in position on the standard 18. The bar 25 abuts a movable jaw 29, formed on the handle 16, adjacent to the stationary jaw 24, for a purpose which will be presently explained.

A presser foot 30 depends downwardly from the handle 16, and is adapted to fall into the space between the members 13 and 15. One face of this presser foot is adapted to aline with the flat face of the member 15, when the handle 16 is in its lowermost position.

The member 15, as shown in Figs. 4 and 9, is provided with a pair of parallel grooves 31 and 32, to receive the legs 35 and 34, respectively, of a ram's horn link generally designated by the numeral 36.

The handle 16 is provided with a flat surface 37 offset from the presser foot 30, which engages both legs of the link 36 when said legs are located within the grooves 31 and 32 of the member 15.

The elongated block 11 is provided with an elevated portion 40, which has a curved groove generally designated by the numeral 41, as shown in Figs. 4, 9 and 10, to receive one horn 42 of the link 36. The other horn 43 is adapted to be received within a similar groove 44 formed in the upper jaw 45, which is formed at the under face of the lever 16.

It will be noted from Figs. 3 and 11 that the jaw 45 is curved laterally and is offset from the handle 16 so that when the handle 16 is lowered and the presser foot 30 engages the free ends of the horns 42 and 43 for moving them downwardly and away from the body of the link the operator may inspect the link 36 to see that it is in proper position during this operation. The presser foot will be limited in its downward movement when the flat surface or jaw 37 engages that portion of the link which is seated on the flat face of the member 15.

On the elevated portion 40 of the elongated block is provided a pair of spaced ribs 46 and 47 to support the link 36 for a predetermined operation which will be presently described.

The jaw 45 on the handle 16 is provided with a cut-out portion at its under face to provide a horizontal surface 48 and inclined surfaces 49. This cut-out portion is moved downwardly toward the ribs 46 and 47.

A spreading tooth 50 is secured in a pocket 51 formed in the handle 16 by means of a bolt 52. Since the shank of the tooth fits neatly within the pocket 51, the tooth will be held rigidly against movement. The tooth extends downwardly, and is tapered to the extreme pointed end 53. The block 11 is provided with a passage 54 to receive the tooth 50. This tooth is adapted to spread the connecting portions of another type of link 55.

The movable jaw 29 which is formed on one end of the handle 16 is provided with step portions 60, 61, 62 and 63 for a purpose which will be presently explained. These step portions, however, cooperate for holding links of varying lengths when the jaw 24 operates thereon.

The operation of my device is as follows:

Two types of links 36 and 55 are illustrated on which various operations are performed for removing the links, and for replacing new links in a chain. In the type shown in Figs. 5 and 6 the link 55 is formed from a single strand of wire, which is bent to form a loop having a pair of legs 65 and 66. These legs are brought together as shown at 67 and they are then bent upon themselves to form a loop to receive a loop of an adjacent link 55a.

When it is desired to remove a link 55 said link is placed in the position shown in Fig. 5 on the inclined top 68 of the block 11, where the passage 54 is located, and after the lever 16 has been raised. The link is in such a position, however, that when the lever 16 is lowered the pointed end 53 will be forced down between the ends 69 and 70 and the legs 65 and 66 of the link 55. In view of the fact that this tooth is tapered it will gradually force the ends 69 and 70 away from their former locked position until they are spread sufficiently apart to remove the link 55a. The legs of the links are then spread apart and removed from the associated link 71.

A new link 72 is then placed in position so that the loop portion will be received by the link 71. The link 72 is then placed upon the step portions 60 and 61 with the free ends 73 and 74 of said link beneath the jaw 24. The lowering of the lever 16 will cause the movable jaw 29 to approach the stationary jaw 24 so that the stationary jaw will force the free ends of the link 72 downwardly until they are in contact with the legs of the link. This completes the operation of removing and replacing a link of the type shown at 55, in Figs. 5 and 6.

The step portions 60, 61, 62 and 63 are provided to support links of varying lengths. As shown in Fig. 6, the link 72 is supported by the step portions 60 and 61. Longer links with legs of greater diameter may require the additional step portion 62 or the portion 63 for supporting the same thereon in order that the stationary jaw 24 will naturally engage the free ends 73 and 74 of the link so that the free ends may be forced into operative connecting position.

The link operated on in Figs. 7 to 10, inclusive, is what is known as the ram's horn. In order to release a link of this type from a chain the legs 34 and 35 are laid lengthwise along the upper face of the member 15 while the portion 36a is supported by the depressed portion 14 in the member 13. The ends of the horns 42 and 43 project upwardly below the presser foot 30, so that when the handle 16 is moved downwardly the bottom face of the presser foot will engage the free ends of the horns and force them downwardly away from the legs 34 and 35. This completes the first step in removing this type of link from the chain.

The link is then placed in position on the upper face of the member 15 with the legs 34 and 35 disposed respectively within the transverse grooves 31 and 32 of the member 15 of the block 11 after the handle 16 has been raised. With the link 36 in position the handle is then lowered until the flat surface 37 on the lower edge of the handle comes in contact with the legs 34 and 35, and sufficient pressure is exerted on the handle to prevent the link from turning. The free ends of the horns 42 and 43 are close together and below the plane passing through the legs 34 and 35 of the link since said ends have been depressed previously by the member 30 (Fig. 7). An end of a screw driver is inserted between the end of a horn and a leg and then the handle of the screw driver is rocked so that the end of said screw will engage the associated leg as a fulcrum, while the end of the tool will press against the horn and spread it laterally away from its former position to the position shown in Fig. 8, so that the loop 36 of another link may be substituted for a link which has been removed. Forcing the horns out of their normal positions in a chain also permits the removal of a worn link. In other words, the horns are not only moved out of their normal positions in a link, but they are spread apart by a suitable tool, such as a screw driver, acting as a lever to permit the removal of a worn link and the application of a new link as a replacement of the worn link.

When it is desired to replace the link removed the new link after having been connected to the adjacent link of the chain is then placed in the position shown in Fig. 9, with the horn 42 located in the groove 41 of the member 40, while the horn 43 is located within the groove 44, formed at the under face of the handle 16. The handle is then forced downwardly and the pressure forces the two horns together, but the two horns, however, are in a position which is outwardly from the legs 34 and 35, and they must be forced inwardly to the lower locking position as shown in Fig. 7. In order to complete the operation the link is laid upon the ribs 46 and 47 transversely of the block 11 in the position shown in Fig. 10, so that the horizontal portion 48 will rest on the tops of the horns while the inclined side walls 49 will engage the side edges of the horns, forcing the horns toward each other and bending the horns down inwardly through the loop between the legs 34 and 35.

It will be seen by this device that several types of links may be readily removed from a chain and replaced by a few simple operations as shown in Figs. 5 to 10 inclusive.

I claim:

1. A chain repairing device for a ram's horn link chain, each link being formed of a single strand of wire bent to form a loop, with the free ends of the wire inturned and disposed in one end of the loop; comprising an elongated block, having a fixed upstanding member provided with a depression at its upper end to receive the bent elements of a ram's horn link, a fixed supporting member for the other end of the link and spaced from the upstanding member, a jaw pivoted adjacent one end of the block and provided with an operating handle extending over the block, a presser foot extending downwardly from the handle and adapted to be moved into the space between the upstanding member and the supporting member to engage the free inturned ends of the link and to force said free ends out of engagement with the link so that the link may be removed from a chain.

2. A chain repairing device for a ram's horn link chain, each link being formed of a single strand of wire bent to form a loop, with the free ends of the wire inturned and disposed in one end of the loop, comprising an elongated block, having a fixed upstanding member provided with a depression at its upper end to receive the bent elements of a ram's horn link, a fixed supporting member for the other end of the link and spaced from the upstanding member, a jaw pivoted adjacent one end of the block and provided with an operating handle extending over the block, said handle at its under face having a depending projection which forms a presser foot and a horizontal portion extending inwardly for a short distance toward the pivot, said foot adapted to to be moved downwardly by the handle for engagement with the free inturned ends of the link forcing said free ends out of engagement with the link so that the link may be removed from a chain while the horizontal portion is moved into engagement with the loop of the link to limit the downward movement of the presser foot.

3. A chain repairing device for a ram's horn link chain, each link being formed of a single strand of wire bent to provide a loop with the free ends of said wire inturned and disposed within one end of the loop, comprising an elongated block having spaced upstanding members, each upstanding member adapted to receive an end of the link and support said link in substantially a horizontal position across the space between said members, a handle pivoted at one end on one end of the block and extending over the block, the underface of the handle above the upstanding members having a curved lateral offset, a presser foot depending from the offset and adapted to be moved into the space between the members to engage the free inturned ends of the link for forcing said ends out of engagement with the link, said offset having a flat jaw located upwardly from the foot and directly opposing one of said upstanding members for pressing on the link when the foot has forced the inturned ends away from the link.

NICOLL C. ODDO.